(12) United States Patent
Yu

(10) Patent No.: US 11,137,646 B1
(45) Date of Patent: Oct. 5, 2021

(54) LIQUID CRYSTAL DISPLAY PANEL AND DISPLAY DEVICE

(71) Applicant: WUHAN CHINA STAR OPTOELECTRONICS TECHNOLOGY CO., LTD., Wuhan (CN)

(72) Inventor: Pengfei Yu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/896,760

(22) Filed: Jun. 9, 2020

(30) Foreign Application Priority Data

Mar. 27, 2020 (CN) .......................... 202010229812.9

(51) Int. Cl.
*G02F 1/1339* (2006.01)
(52) U.S. Cl.
CPC ...... *G02F 1/13394* (2013.01); *G02F 1/13396* (2021.01)
(58) Field of Classification Search
CPC ............. G02F 1/133512; G02F 1/1368; G02F 1/133308; G02F 1/1333; G02F 1/13394; G02F 1/13396; G02F 1/133608; G02F 1/1339; G02F 1/1343; G02F 1/134309; G02F 1/1362; G02F 1/136286
See application file for complete search history.

(56) References Cited

U.S. PATENT DOCUMENTS

| | | | |
|---|---|---|---|
| 2008/0018835 A1* | 1/2008 | Li | G02F 1/1341 349/106 |
| 2015/0316807 A1* | 11/2015 | Cai | G02F 1/13394 428/1.54 |
| 2020/0174301 A1* | 6/2020 | Tien | G03B 17/02 |

* cited by examiner

*Primary Examiner* — Thoi V Duong
(74) *Attorney, Agent, or Firm* — Osha Bergman Watanabe & Burton LLP

(57) ABSTRACT

The present invention provides a liquid crystal display panel and a display device. The liquid crystal display panel includes: a first substrate; a second substrate disposed opposite to the first substrate; liquid crystals filled between the first substrate and the second substrate; and first support walls disposed on the first substrate to support the second substrate, wherein the first support walls are disposed around the first blind hole and formed with a liquid crystal channel having a size larger than a size of each of the liquid crystals. In the present invention, by disposing the first support walls on the first substrate and around the first blind hole, when the first substrate and the second substrate are bonded by vacuum cell-assembly, the edge of the blind hole is supported, such that recessing of the glass substrate can be mitigated.

8 Claims, 9 Drawing Sheets

LIQUID CRYSTAL DISPLAY PANEL AND DISPLAY DEVICE

BACKGROUND OF INVENTION

Field of Invention

The present invention relates to a field of display technology, in particular to a liquid crystal display panel and a display device.

Description of Prior Art

In order to realize the under-screen camera, the current technology provides two solutions of a through hole and a blind hole, and the blind hole solution does not require notch-cutting of the glass substrate and are generally used in actual products.

The blind hole solution is to reserve a round hole space when the color filter of the glass substrate and the array substrate are coated, and then dig a hole in a layer at a position of the round hole without damaging the glass substrate. When the color filter substrate and the array substrate are cell-assembled, liquid crystal is added dropwise to the round hole space, and a round light-transmitting area is formed on the glass substrate to realize the design of the blind hole opened in-plane in a liquid crystal product.

However, because part of the layer needs to be hollowed out in the blind hole area, a height of the liquid crystal layer in the blind hole area is different from that in the normal display area when the liquid crystal is dropped, but the amount of liquid crystal dropped in the entire liquid crystal display panel is consistent, so that the color filter when the substrate and the array substrate are cell-assembled in a vacuum, the glass substrate in the blind hole area will be recessed inwards due to the vacuum, causing the color filter substrate and the array substrate in the blind hole area to form a concave lens effect.

SUMMARY OF INVENTION

The present invention provides a liquid crystal display panel and a display device, so as to alleviate the technical problem that the glass substrate of the existing liquid crystal display panel recesses at the blind hole area during vacuum cell-assembly.

To solve the above problems, the technical solutions according to the present invention are as follows:

The present invention provides a liquid crystal display panel, provided with a first blind hole, and comprising:

a first substrate;

a second substrate disposed opposite to the first substrate;

liquid crystals filled between the first substrate and the second substrate; and first support walls disposed on the first substrate to support the second substrate, wherein the first support walls are disposed around the first blind hole and configured to mitigate recessing of the second substrate.

In the liquid crystal display panel according to an embodiment of the present invention, the first support walls are formed with a liquid crystal channel having a size larger than a size of each of the liquid crystals.

In the liquid crystal display panel according to an embodiment of the present invention, a number of the first support walls is greater than two, and a gap between adjacent ones of the first support walls is defined as the liquid crystal channel.

In the liquid crystal display panel according to an embodiment of the present invention, a vacuum cavity is formed inside the first support walls.

In the liquid crystal display panel according to an embodiment of the present invention, the liquid crystal display panel is formed with a second blind hole, and the liquid crystal display panel further comprises:

second support walls disposed on the first substrate and around the second blind hole, to support the second substrate.

In the liquid crystal display panel according to an embodiment of the present invention, a number of the second support walls is greater than two, and a gap between adjacent second support walls is defined as the liquid crystal channel.

In the liquid crystal display panel according to an embodiment of the present invention, a vacuum cavity is formed inside the second support walls.

In the liquid crystal display panel according to an embodiment of the present invention, the liquid crystal display panel further comprises:

a plurality of third support walls formed on the first substrate to support the second substrate, wherein the third support walls are disposed between the first blind hole and the second blind hole, and formed with a liquid crystal channel.

In the liquid crystal display panel according to an embodiment of the present invention, a vacuum cavity is formed inside the third support walls.

An embodiment of the present invention also provides a display device, including:

a cover plate;

a liquid crystal display panel formed with a first blind hole;

a backlight module formed with a through hole corresponding to the first blind hole; and a camera disposed corresponding to the first blind hole, wherein the liquid crystal display panel comprises: a first substrate; a second substrate disposed opposite to the first substrate; liquid crystals filled between the first substrate and the second substrate; and first support walls disposed on the first substrate to support the second substrate, wherein the first support walls are disposed around the first blind hole.

Beneficial effects of the present invention are that: the present invention provides a liquid crystal display panel and a display device. The liquid crystal display panel includes: a first substrate; a second substrate disposed opposite to the first substrate; liquid crystals filled between the first substrate and the second substrate; and first support walls disposed on the first substrate to support the second substrate, wherein the first support walls are disposed around the first blind hole and formed with a liquid crystal channel having a size larger than a size of each of the liquid crystals. In the present invention, by disposing the first support walls on the first substrate and around the first blind hole, when the first substrate and the second substrate are bonded by vacuum cell-assembly, the edge of the blind hole is supported, such that recessing of the glass substrate can be mitigated; further based on the liquid crystal channel, the liquid crystal inside and outside the blind hole can flow and communicate, avoiding the occurrence of vacuum bubbles in the blind hole area, thereby mitigating recessing of the glass substrate, reducing the curvature radius of the glass substrate in the blind hole area, and enhancing the optical performance of the blind hole area; and further, based on the vacuum cavity formed inside the first support wall, the second substrate can recess in the area corresponding to the vacuum cavity, thereby mitigate recessing of the second substrate in the blind hole area based on Seesaw theory relieves the indentation of the second substrate in the blind hole area.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1A:
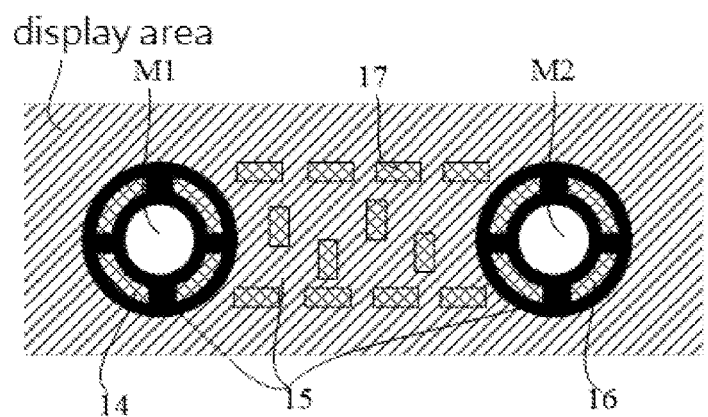
FIG. 1a is a first schematic perspective view of a liquid crystal display panel in a blind hole area according to an embodiment of the present invention.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for implementing different structures of the present invention. In order to simplify the disclosure of the present invention, the components and arrangements of the specific examples are described below. Of course, they are merely examples and are not intended to limit the present invention. In addition, the present invention may repeat reference numerals and/or reference letters in the various embodiments, which are for the purpose of simplicity and clarity, and do not indicate the relationship between the various embodiments and/or arrangements discussed. Moreover, the present invention provides examples of various specific processes and materials, but one of ordinary skill in the art will recognize the use of other processes and/or the use of other materials.

The present invention provides a liquid crystal display panel and a display device, so as to alleviate the technical problem that the glass substrate in the blind hole area of the existing liquid crystal display panel depresses or recesses during vacuum cell-assembly.

In an embodiment, as shown in FIGS. 1a to 2b, a liquid crystal display panel 10 according to an embodiment of the present invention is formed with a first blind hole M1. The liquid crystal display panel 10 includes:

a first substrate 11;

a second substrate 12 disposed opposite to the first substrate 11;

liquid crystals 13 filled between the first substrate 11 and the second substrate 12; and first support walls 14 disposed on the first substrate 11 to support the second substrate 12, wherein the first support walls 14 are disposed around the first blind hole M1 and configured to mitigate recessing of the second substrate 12 in the blind hole area.

This embodiment provides a liquid crystal display panel, wherein by disposing the first support walls on the first substrate and around the first blind hole, when the first substrate and the second substrate are bonded by vacuum cell-assembly, the edge of the blind hole is supported, such that recessing of the glass substrate can be mitigated; further based on the liquid crystal channel, the liquid crystal inside and outside the blind hole can flow and communicate, avoiding the occurrence of vacuum bubbles in the blind hole area, thereby mitigating recessing of the glass substrate, reducing the curvature radius of the glass substrate in the blind hole area, and enhancing the optical performance of the blind hole area.

Figure 1B:
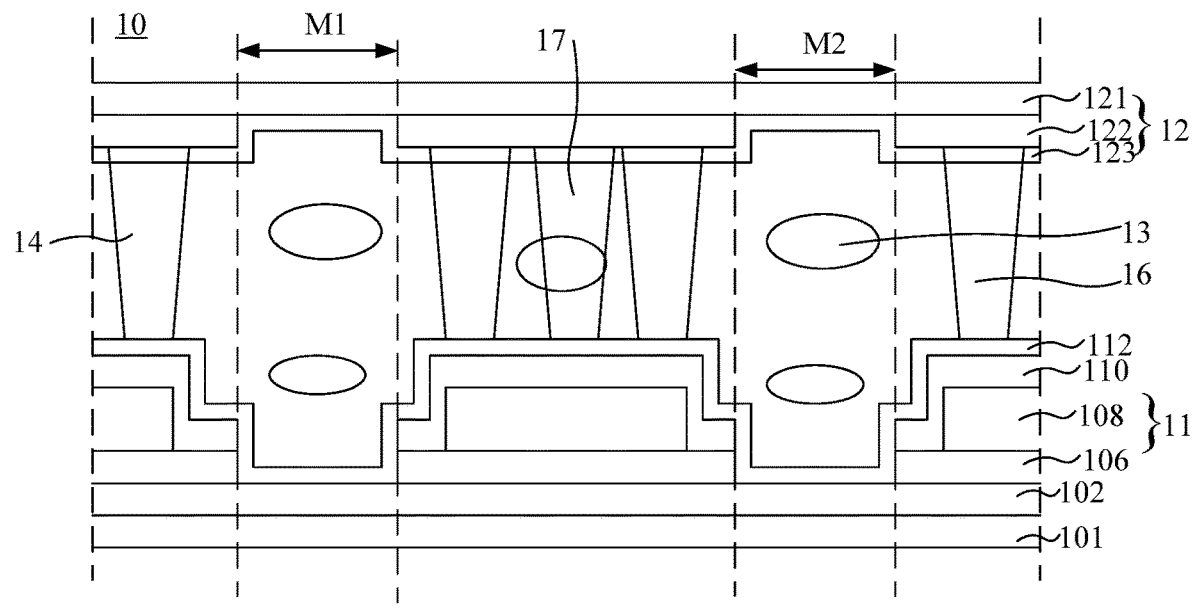
FIG. 1b is a first schematic cross-sectional view of a liquid crystal display panel in a blind hole area according to an embodiment of the present invention.

In an embodiment, as shown in FIG. 1a to 1b, a liquid crystal display panel 10 according to an embodiment of the present invention is formed with a first blind hole M1, and the liquid crystal display panel 10 includes:

a first substrate 11;

a second substrate 12 disposed opposite to the first substrate 11;

liquid crystals 13 filled between the first substrate 11 and the second substrate 12; and first support walls 14 disposed on the first substrate 11 to support the second substrate 12, wherein the first support walls 14 are disposed around the first blind hole M1 and configured to mitigate recessing of the second substrate 12 in the blind hole area.

This embodiment provides a liquid crystal display panel, wherein by disposing the first support walls on the first substrate and around the first blind hole, when the first substrate and the second substrate are bonded by vacuum cell-assembly, the edge of the blind hole is supported, such that recessing of the glass substrate can be mitigated; further based on the liquid crystal channel, the liquid crystal inside and outside the blind hole can flow and communicate, avoiding the occurrence of vacuum bubbles in the blind hole area, thereby mitigating recessing of the glass substrate, reducing the curvature radius of the glass substrate in the blind hole area, and enhancing the optical performance of the blind hole area.

In an embodiment, as shown in FIG. 1a to 1b, a number of the first support walls 14 is greater than two, and a gap between adjacent ones of the first support walls 14 is defined as the liquid crystal channel 15.

In an embodiment, as shown in FIG. 1a to 1b, the first support walls 14 have the same size.

In an embodiment, as shown in FIG. 1a to 1b, the first support walls 14 have a ring shape.

In an embodiment, as shown in FIG. 1a to 1b, the liquid crystal display panel 10 is formed with a second blind hole M2, and the liquid crystal display panel further includes:

second support walls 16 formed on the first substrate and around the second blind hole M2 11 to support the second substrate 1, wherein each of the second support walls 16 is formed with a liquid crystal channel 15.

In an embodiment, as shown in FIG. 1, a number of the second support walls 16 is greater than two, and a gap between adjacent ones second support walls 16 is defined as the liquid crystal channel 15.

In an embodiment, as shown in FIG. 1a to 1b, the second support walls 16 have the same size.

In an embodiment, as shown in FIG. 1a to 1b, the second support walls 16 have a ring shape.

In an embodiment, as shown in FIG. 1a to 1b, the liquid crystal display panel 10 further includes:

third support walls 17 formed on the first substrate 11 to support the second substrate 12, wherein the third support walls 17 are disposed between the first blind hole M1 and the second blind hole M2, and each of the third support walls 17 is formed with a liquid crystal channel 15.

In an embodiment, as shown in FIG. 1a to 1b, the black area refers to a light-shielding layer, which can be made of a black matrix, or can be made of laminated materials of a variety of photoresists. The first support walls 14 and the second support walls 16 are all arranged in a shielding area of the shielding layer.

In an embodiment, as shown in FIG. 1a to 1b, the layer 112 is an alignment layer, the layer 121 is a glass substrate, the layer 123 is an alignment layer, and the layer 122 is a color resist layer.

In an embodiment, the first substrate 11 may be an array substrate, and the second substrate 12 may be a color filter substrate.

In an embodiment, the liquid crystal display panel further includes: a fourth support walls formed on the second substrate to support the first substrate; wherein the fourth support walls are disposed around the first blind hole and formed with a liquid crystal channel. The fourth support walls are disposed opposite to the first support walls.

In an embodiment, a number of the fourth support walls is greater than two, and the gap between adjacent ones of the fourth support walls is defined as the liquid crystal channel.

In an embodiment, the fourth support walls have the same size.

In an embodiment, the liquid crystal display panel further includes: fourth support walls formed on the second substrate to support the first substrate; wherein the fourth support walls are disposed around the first blind hole, and the fourth support walls and the first support walls are staggered with each other, and a liquid crystal channel is formed between the first support walls and the fourth support walls.

In an embodiment, a number of the fourth support walls is greater than two.

In an embodiment, the fourth support walls have the same size.

In an embodiment, the fourth support walls have a ring shape.

In an embodiment, the liquid crystal display panel further includes:

fifth support walls formed on the second substrate to support the first substrate; wherein the fifth support walls are disposed around the second blind hole and opposite to the second support walls.

In an embodiment, a number of the fifth support walls is greater than two, and a gap between adjacent fifth support walls is defined as the liquid crystal channel.

In an embodiment, the liquid crystal display panel further includes:

fifth support walls formed on the second substrate to support the first substrate; wherein the fifth support walls are disposed around the second blind hole and staggered with the second support walls, a gap between adjacent ones of the second support walls and the fifth support walls is defined as the liquid crystal channel.

In an embodiment, the fifth support walls have the same size.

In an embodiment, the fifth support walls have a ring shape.

In an embodiment, the liquid crystal display panel further includes:

sixth support walls formed on the second substrate to support the first substrate; wherein the sixth support walls are provided between the first blind hole and the second blind hole, and disposed opposite to the third support walls.

In an embodiment, the third support walls have the same size.

In an embodiment, the third support walls have different sizes.

In an embodiment, the sixth support walls have the same size.

In an embodiment, the sixth support walls have different sizes.

In an embodiment, the liquid crystal display panel further includes:

sixth support walls formed on the second substrate to support the first substrate; wherein the sixth support walls are provided between the first blind hole and the second blind hole, and staggered with the third support walls.

Figure 2A:
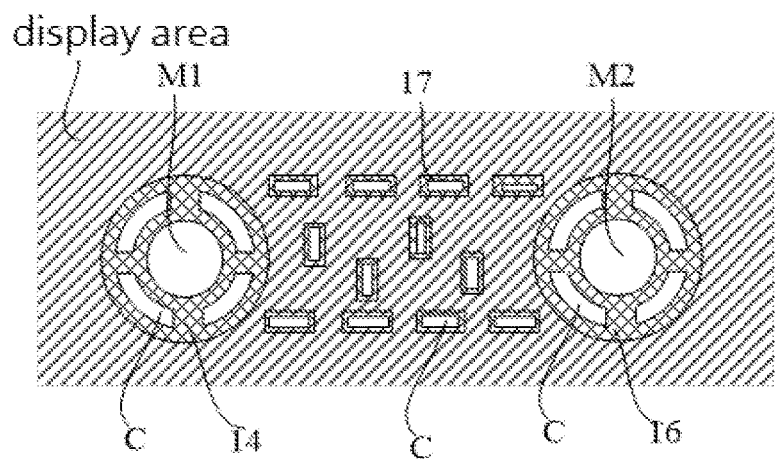
FIG. 2a is a second schematic perspective view of a liquid crystal display panel in a blind hole area according to an embodiment of the present invention.
Figure 2B:
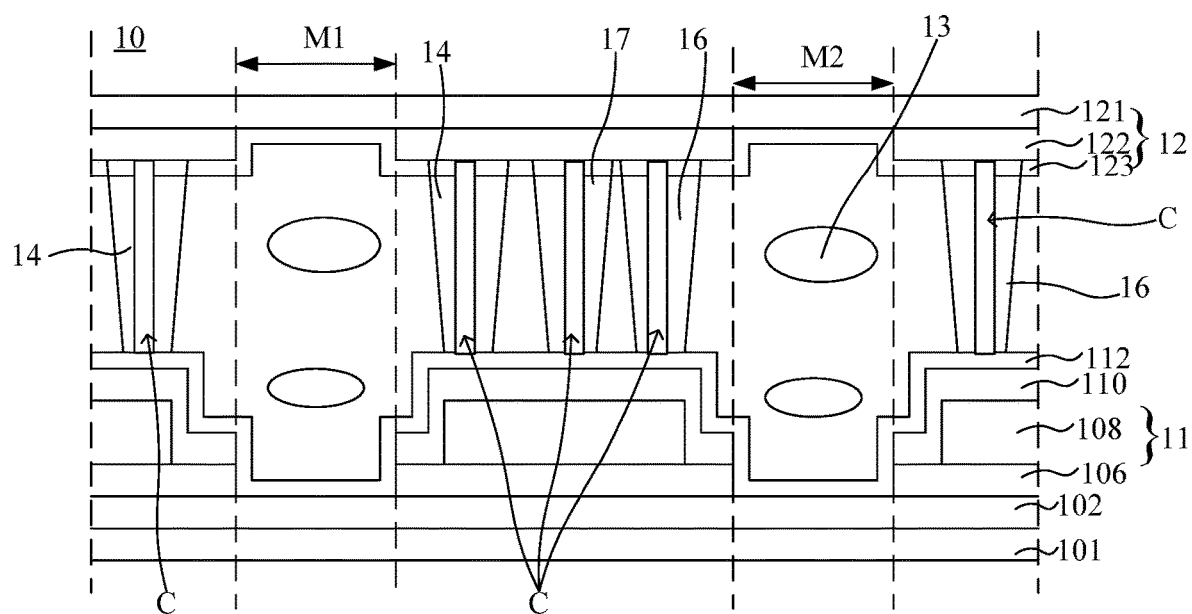
FIG. 2b is a second schematic cross-sectional view of a liquid crystal display panel in a blind hole area according to an embodiment of the present invention.

In an embodiment, as shown in FIGS. 2a to 2b, a liquid crystal display panel 10 according to an embodiment of the present invention is formed with a first blind hole M1. The liquid crystal display panel 10 includes:

a first substrate 11;

a second substrate 12 disposed opposite to the first substrate 11;

liquid crystals 13 filled between the first substrate 11 and the second substrate 12; and first support walls 14 disposed on the first substrate 11 to support the second substrate 12, wherein, the first support walls 14 are disposed around the first blind hole M1, and a vacuum cavity C is formed inside the first support walls 14. Based on the vacuum cavity C, after the combination of the second substrate and the first substrate, since no liquid crystal in the vacuum cavity C, the vacuum cavity exhibits a vacuum state, and the second substrate will recess in the area corresponding to the vacuum cavity C under the external atmospheric pressure. In this case, a side of the first support walls 14 is used as a fulcrum of the seesaw, and based on the Seesaw effect, the second substrate in the blind hole area will be upturned, which can mitigate recessing of the second substrate in the blind hole area.

This embodiment provides a liquid crystal display panel, wherein by disposing the first support walls on the first substrate and around the first blind hole, when the first substrate and the second substrate are bonded by vacuum cell-assembly, the edge of the blind hole is supported, such that recessing of the glass substrate can be mitigated; and meanwhile, based on the vacuum cavity formed inside the first support wall, the second substrate can recess in the area corresponding to the vacuum cavity, thereby mitigate recessing of the second substrate in the blind hole area based on Seesaw theory relieves the indentation of the second substrate in the blind hole area.

In an embodiment, a number of the first support walls 14 is greater than two, a gap between adjacent first support walls 14 is defined as the liquid crystal channel, and a vacuum cavity C is formed inside each of the first support walls 14.

In an embodiment, the first support walls 14 have the same size.

In an embodiment, the first support walls 14 are ring-shaped.

In an embodiment, as shown in FIGS. 2a to 2b, the liquid crystal display panel 10 is formed with a second blind hole M2, and the liquid crystal display panel further includes:

second support walls 16 formed on the first substrate and around the second blind hole M2 11 to support the second substrate 1, wherein a vacuum cavity C is formed inside the second support walls 16.

In an embodiment, a number of the second support walls 16 is greater than two, a gap between adjacent second support walls 16 is defined as the liquid crystal channel, and a vacuum cavity C is formed inside each of the second support walls 16.

In an embodiment, the second support walls 16 have the same size.

In an embodiment, the second support walls 16 are ring-shaped.

In an embodiment, as shown in FIGS. 2a to 2b, the liquid crystal display panel 10 further includes:

third support walls 17 formed on the first substrate 11 to support the second substrate 12; wherein the third support walls 17 are disposed between the first blind hole M1 and the second blind hole M2, and a vacuum cavity C is formed inside the third support walls 17.

Meanwhile, with the rapid development of the panel industry, the design of the liquid crystal display panel industry is also approaching the limit. Therefore, to understand how much space to design, it is necessary to accurately measure each key parameter of the product and simultaneously compare it with simulation, to get the optimal value of product design.

At present, there are two difficulties in monitoring the pixel voltage of the display area: first, if the test point is designed in the display area, it may impact the normal display of the liquid crystal display panel, causing display abnormality; second, the capacitance of the pixel electrode and the common electrode is relatively small, generally below 1 pF, and when the external test point is connected, the pixel voltage is likely to be released in the air, resulting in failure of detection.

The following embodiments are configured to provide a liquid crystal display panel and a display device to improve the accuracy of pixel voltage measurement in the display area of the liquid crystal display panel.

Figure 11:
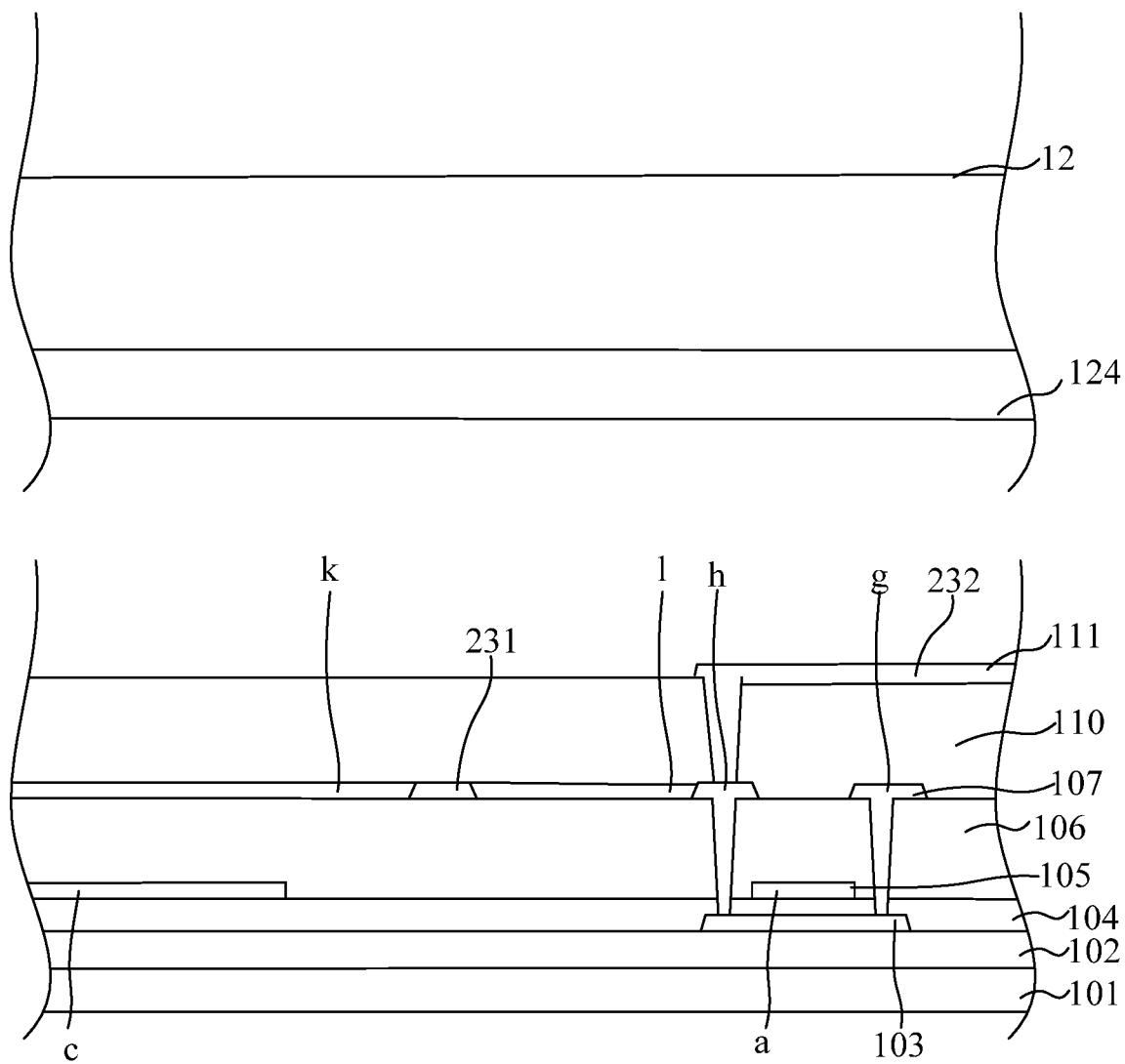
FIG. 11 is a schematic diagram of a third layer of a liquid crystal display panel according to an embodiment of the present invention.

In an embodiment, as shown in FIGS. 3 to 13, the liquid crystal display panel 10 according to the embodiment of the present invention includes an array substrate 11 and a color filter substrate 12 that are disposed opposite to each other. The array substrate 11 includes:

invalid pixels 21 arranged in an array; as shown in FIG. 11, the pixels 20 formed by the array substrate 11 include invalid pixels 21 arranged in rows and valid pixels 22 arranged in arrays. The valid pixels 22 are located in the display area, and the invalid pixels 21 are located between a display area and a sealant area;

an invalid gate driving unit 30 disposed corresponding to the invalid pixels 21;

a disable signal terminal 40 configured to output a voltage signal of a disable switch transistor; and a common voltage terminal 50 configured to output a common voltage;

wherein, the invalid pixels 21 include a test pixel 23, the test pixel 23 includes a driving circuit located and a test terminal 231 in a shielding area, and a pixel electrode 232 located in a light-transmitting area. The driving circuit includes a test switch transistor 233, and the test terminal 231 is connected to the pixel electrode 232 and is used as a pixel voltage test point.

Figure 3:
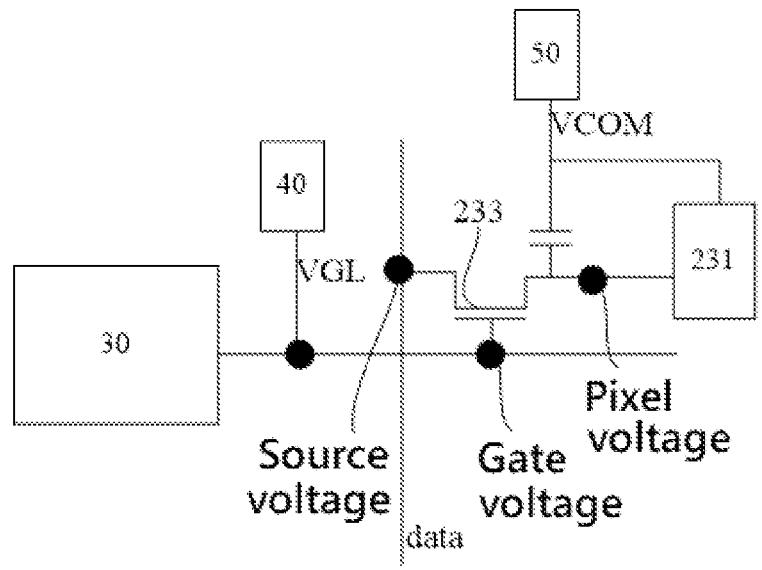
FIG. 3 is a schematic diagram of connection of a test pixel when it does not work according to an embodiment of the present invention.
Figure 4:
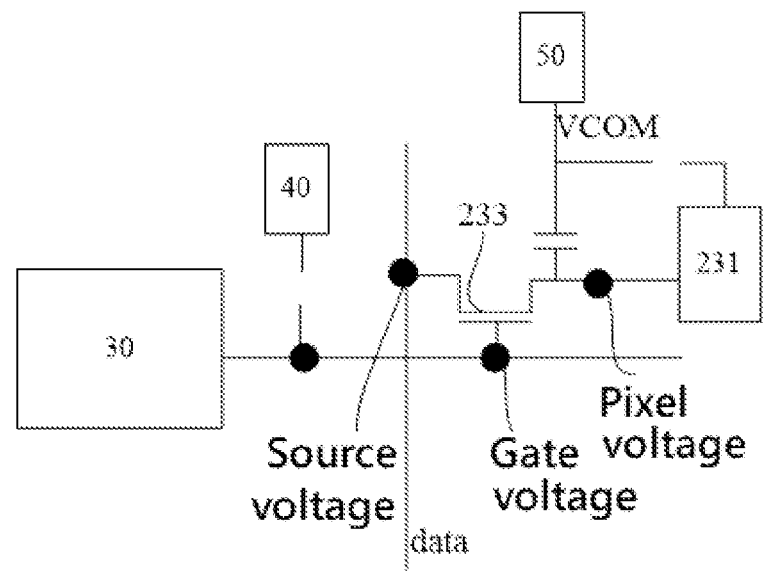
FIG. 4 is a schematic diagram of connection of a test pixel when it is in operation according to an embodiment of the present invention.

A gate of the test switch transistor 233 is connected to a signal output terminal of the invalid gate drive unit 30 and the disable signal terminal 40, and the test terminal is connected to the common voltage terminal 50. As shown in FIG. 3, when no pixel voltage needs to be tested, the invalid gate driving unit 30 does not output a switching signal. As shown in FIG. 4, when a pixel voltage needs to be tested, the gate of the test switching transistor 233 and the disable signal terminal 40 are disconnected, the connection between the test terminal 231 and the common voltage terminal 50 is interrupted, and the invalid gate driving unit 30 outputs a switching signal to turn on the test pixel.

Specifically, in a non-testing stage, as shown in FIG. 3, the output line of the invalid gate driving unit 30 is connected to the disable signal terminal 40, the pixel electrode 232 is led to a test terminal 231, and the test terminal 231 is connected to the common voltage terminal 50. As such, in a normal display stage, the invalid gate drive unit 30 is in a off state, which has no effect on the display of the display area, and because the gate voltage of the test switch transistor 233 is VGL, and the test switch transistor 233 is turned off, while the pixel electrode is connected to the VCOM potential of the common voltage terminal 50, so that there is no voltage difference between the pixel electrode and VCOM, that is, no electric field exists, so the liquid crystal thereon will not be driven to cause light leakage. In a testing stage, as shown in FIG. 4, the connection line between the gate of the test switch transistor 233 and the disable signal terminal 40 and the connection line between the pixel electrode and the VCOM signal are disconnected with a laser, and thus the gate signal of 233 of the test switch transistor will be output, the gate voltage will change according to the voltage of the data line data, the pixel electrode will be charged to generate the pixel voltage when the data line data outputs a signal, and finally a pliers or another equipment is used to disassemble a top corner of the liquid crystal display panel, such that the voltage of the test terminal 231 is measured by a measuring probe to obtain the pixel voltage, and the pixel voltage measurement is completed.

The pixels that are not specified in the embodiments of the present invention all refer to sub-pixels.

Based on the structure provided in this embodiment, the test pixel is an invalid pixel, and when no test pixel needs to be tested, the test pixel does not work, and there is no voltage difference between the pixel electrode and the common electrode, which will not cause the liquid crystal to deflect, and thus will not impact the normal display of the liquid crystal display panel; while when a test pixel needs to be tested, the test pixel is in operation, the connection between the pixel electrode and the common electrode is interrupted to form a voltage difference, so that the liquid crystal is normally deflected, and since the test terminal is set in the shielding area of the test pixel, it will not be released in the air, which improves the accuracy of pixel voltage measurement in the display area of the liquid crystal display panel.

In an embodiment, the liquid crystal display panel may be a liquid crystal display panel of a vertical deflection type or a horizontal deflection type. In the liquid crystal display panel of the vertical deflection type, the pixel electrodes on the array substrate and the common electrode on the color filter substrate form a vertical electric field to control the liquid crystal deflection, and in the liquid crystal display panel of the horizontal deflection type, the pixel electrode and the common electrode on the array substrate form a horizontal electric field to control the liquid crystal deflection.

In an embodiment, the color filter layer (ie, the red color resist layer, the green color resist layer, and the blue color resist layer) may be formed only on the color filter substrate, and in this case, the liquid crystal display panel has a conventional structure. Alternatively, the color filter layer may be formed only on the array substrate, and in this case, the liquid crystal display panel has a COA structure. Also, the color filter layer can be formed on the color filter substrate and the array substrate at the same time, and in this case, the liquid crystal display panel has a higher color gamut.

In an embodiment, the pixels of the display area are arranged in a manner that red sub-pixels, green sub-pixels, and blue sub-pixels are alternately arranged, or may also in a manner of sub-pixel multiplexing.

In an embodiment, the driving circuit of the sub-pixel may include only one transistor, or may be in a way in which the transistor and the storage capacitor coexist, such as a pixel structure such as 3T1C, 7T1C, 8T2C etc.

Herein, taking the liquid crystal display panel of the horizontal deflection type, in which the driving circuit includes only one transistor as an example, the present invention will be further described.

In an embodiment, the array substrate includes:

a substrate;

a buffer layer formed on the substrate;

a first metal layer formed on the buffer layer, and patterned to form the gate of the test switching transistor;

an interlayer insulating layer formed on the first metal layer;

a second metal layer formed on the interlayer insulating layer;

a planarization layer formed on the second metal layer;

a first transparent conductive layer formed on the planarization layer, and patterned to form an common electrode of the array substrate and the test terminal, wherein the test terminal is insulated from the common electrode of the array substrate;

a passivation layer formed on the first transparent conductive layer; and a second transparent conductive layer formed on the passivation layer, and patterned to form the pixel electrode.

In an embodiment, the first metal layer is also patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

In an embodiment, the second metal layer is patterned at a position corresponding to the test terminals to form a test pattern of the second metal layer, and patterned at a position corresponding to the common voltage terminal to form a common voltage pattern of the second metal layer, wherein a second connection line is patterned between the test pattern of the second metal layer and the common voltage pattern of the second metal layer, and the test terminal is connected to the test pattern of the second metal layer through a via hole, the test pattern of the second metal layer is connected to the common voltage pattern of the second metal layer through the second connection line, and the common voltage pattern of the second metal layer is connected to the common voltage terminal through a via hole. When a pixel voltage needs to be tested, the second connection line is cut off.

In an embodiment, a number of the second connection lines is greater than one.

In an embodiment, the common voltage pattern of the second metal layer is connected to the common electrode of the array substrate through a via hole, and the common electrode of the array substrate is connected to the common voltage terminal.

In an embodiment, the drive circuit further includes a test driving transistor, the second metal layer is also patterned to form a drain of the test driving transistor, the pixel electrode is connected to the drain of the test driving transistor through a via hole, and the drain of the test driving transistor is connected to the test pattern of the second metal layer.

In an embodiment, the test pixel further includes a conversion area located in the shielding area; the second metal layer is patterned at a position corresponding to the conversion area to form a conversion pattern of the second metal layer, the first metal layer is patterned to form a conversion pattern of the first metal layer at a position corresponding to the conversion area, and the first metal layer is patterned at a position corresponding to the test terminal to form a test pattern of the first metal layer. The second metal layer is also patterned to form a third connection line, the first metal layer is also patterned to form a fourth connection line, the drain of the test driving transistor is connected to the conversion pattern of the second metal layer through the third connection line, the conversion pattern of the second metal layer is connected to the conversion pattern of the first metal layer through a via hole, the conversion pattern of the first metal layer is connected to the test pattern of the first metal layer through the fourth connection line, and the test pattern of the first metal layer is connected to the test terminal.

In an embodiment, the test pattern of the first metal layer is directly connected to the test terminal through a via hole, or the test pattern of the first metal layer is connected to the test pattern of the second metal layer through a via hole.

In an embodiment, as shown in FIGS. 5-8, the array substrate 11 includes:

a substrate 101, which may be a rigid substrate, made of a material, such as a glass, a transparent resin etc.; or may also be a flexible substrate, made of a material, such as polyimide, polycarbonate, polyethersulfone, polyethylene terephthalate, polyethylene naphthalate, a polyaryl compound or a glass fiber reinforced plastic etc., and are first formed on a glass substrate by coating, followed by peeling off the glass substrate by a method such as laser peeling, after the display panel is prepared;

a buffer layer 102 formed on the substrate, which may be made of a inorganic material, such as silicon oxide, silicon nitride etc.;

an active layer 103 formed on the buffer layer 102, which may be made of a metal oxide, such as indium gallium zinc oxide (IGZO), but not limited thereto, and may also be made of one ore more of aluminum zinc oxide (AZO), indium zinc oxide (IZO), zinc oxide (ZnO), indium oxide (In2O3), boron-doped zinc oxide (BZO), and magnesium-doped zinc oxide (MZO), and alternatively made of a polysilicon material or other materials;

a gate insulating layer 104 formed on the active layer 103, which may be made of an inorganic material such as silicon oxide, silicon nitride etc.;

a first metal layer 105 formed on the gate insulating layer 104, which may be made of molybdenum, aluminum, or copper, but not limited thereto, but may also be made of chromium, tungsten, titanium, tantalum, or an alloy thereof, which are not specifically limited herein;

an interlayer insulating layer 106 formed on the first metal layer 105, which may be made of an inorganic material such as silicon oxide, silicon nitride etc.;

a second metal layer 107 formed on the interlayer insulating layer 106, which may be made of molybdenum, aluminum, or copper, but not limited thereto, but may also be made of chromium, tungsten, titanium, tantalum, or an alloy thereof, which are not specifically limited herein;

a planarization layer 108 formed on the second metal layer 107, which may be made of a photoresist, and formed on the second metal layer 107 by coating;

a first transparent conductive layer 109 formed on the planarization layer 108, which may be made of a conductive glass (ITO) or the like;

a passivation layer 110 formed on the first transparent conductive layer 109, which may be made of at least one of silicon oxide and silicon nitride;

a second transparent conductive layer 111 formed on the passivation layer 110, which may be made of a conductive glass (ITO) or the like.

The first metal layer 105 is patterned to form a gate a, a gate scan line b, a first connection line c, a conversion pattern d of the first metal layer, a test pattern e of the first metal layer, and a fourth connection line f. The second metal layer 107 is patterned to form a data line data, a source g, a drain h, a test pattern i of the second metal layer, a common voltage pattern j of the second metal layer, a second connection line k, a third connection line l and a conversion pattern m of the second metal layer. The first transparent conductive layer 109 is patterned to form the test terminal 231 and a common electrode n of the array substrate, and the second transparent conductive layer 111 is patterned to form the pixel electrode 232.

Figure 5:
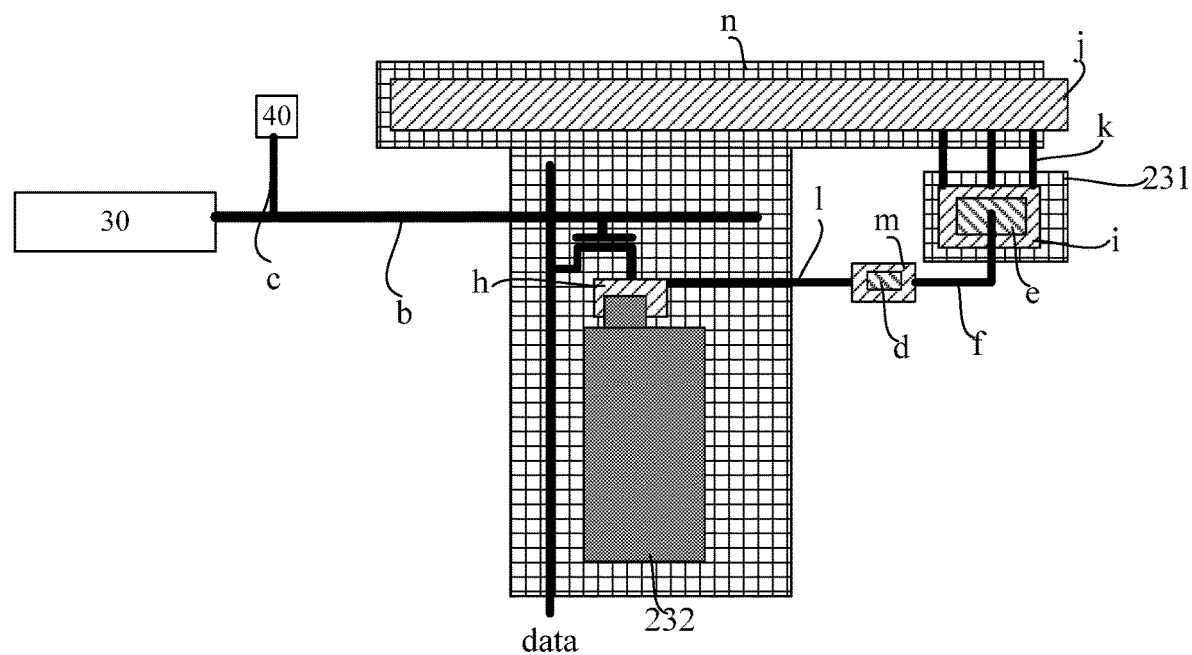
FIG. 5 is a first schematic perspective diagram of a test pixel when it does not work according to an embodiment of the present invention.
Figure 6:
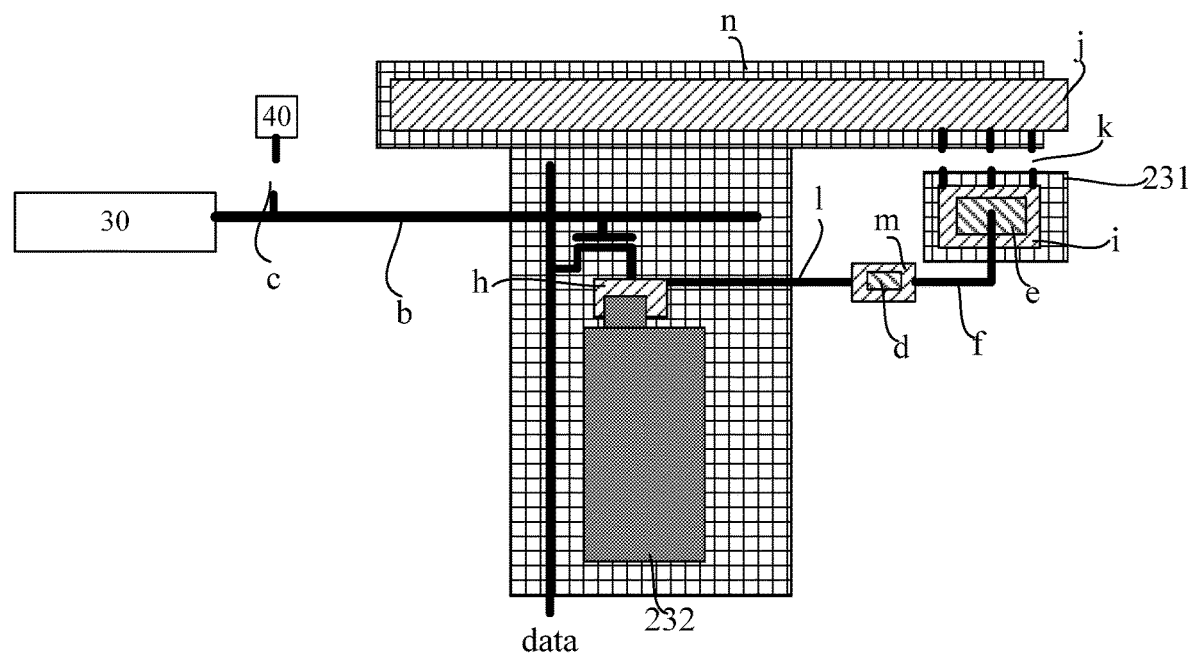
FIG. 6 is a first schematic perspective view of a test pixel provided when it is in operation by an embodiment of the present.
Figure 7:
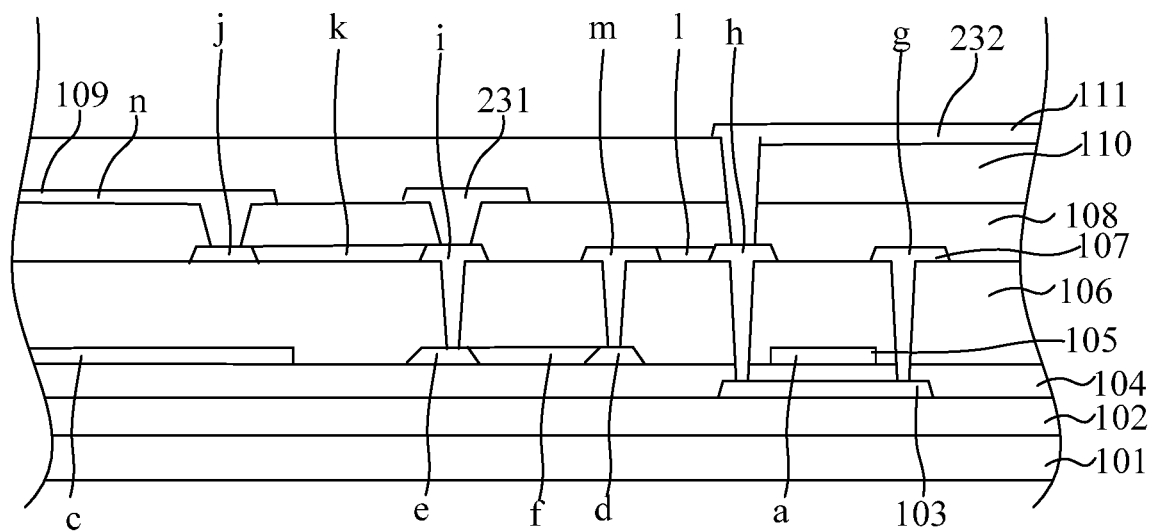
FIG. 7 is a schematic diagram of a first layer of a liquid crystal display panel according to an embodiment of the present invention.
Figure 8:
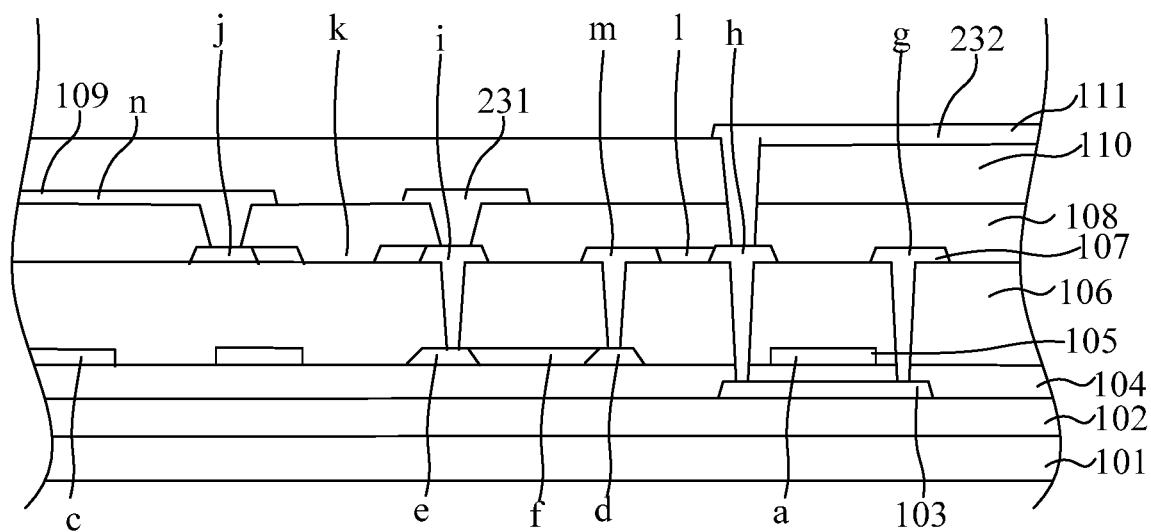
FIG. 8 is a schematic diagram of a second layer of a liquid crystal display panel according to an embodiment of the present invention.

As shown in FIGS. 5 and 7, when pixel voltage detection is not performed, the first connection line c and the second connection line k are kept connected, the transistor 233 is not in operation at this time, and the pixel electrode 232, the test terminal 231, and the common electrode of the array substrate n is kept connected, such that there is no voltage difference between the pixel electrode 232 and the common electrode n of the array substrate. As shown in FIGS. 6 and 8, when pixel voltage detection is performed, both the first connection line c and the second connection line k are cut off by laser, etc., the transistor 233 is in operation, the pixel electrode 232 and the test terminal 231 are kept connected, the pixel electrode 232 is charged, and the pixel voltage can be detected through the test terminal 231.

Herein, taking the liquid crystal display panel of the vertical deflection type, in which the driving circuit includes only one transistor as an example, the present invention will be further described.

In an embodiment, the array substrate includes:
Substrate
a substrate;
a buffer layer formed on the substrate;
a first metal layer formed on the buffer layer, and patterned to form the gate of the test switching transistor;
an interlayer insulating layer formed on the first metal layer;
a second metal layer formed on the interlayer insulating layer;
a passivation layer formed on the second metal layer; and
a second transparent conductive layer formed on the passivation layer and patterned to form the pixel electrode.

In an embodiment, the first metal layer is also patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

In an embodiment, the second metal layer is patterned to form a test terminal and a second connection line. The test terminal is connected to the common voltage terminal through the second connection line. When a pixel voltage needs to be tested, the second connection line is cut off.

In an embodiment, a number of the second connection lines is greater than one.

In an embodiment, the drive circuit further includes a test driving transistor, the second metal layer is also patterned to form a drain of the test driving transistor, the pixel electrode is connected to the drain of the test driving transistor through a via hole, and the drain of the test driving transistor is connected to the test terminal.

In an embodiment, the second metal layer is also patterned to form a third connection line, and a drain of the test driving transistor is connected to the test terminal through the third connection line.

In an embodiment, as shown in FIGS. 9-12, the array substrate 11 includes:
a substrate 101, which may be a rigid substrate, made of a material, such as a glass, a transparent resin etc.; or may also be a flexible substrate, made of a material, such as polyimide, polycarbonate, polyethersulfone, polyethylene terephthalate, polyethylene naphthalate, a polyaryl compound or a glass fiber reinforced plastic etc., and are first formed on a glass substrate by coating, followed by peeling off the glass substrate by a method such as laser peeling, after the display panel is prepared;
a buffer layer 102 formed on the substrate, which may be made of a inorganic material, such as silicon oxide, silicon nitride etc.;
an active layer 103 formed on the buffer layer 102, which may be made of a metal oxide, such as indium gallium zinc oxide (IGZO), but not limited thereto, and may also be made of one ore more of aluminum zinc oxide (AZO), indium zinc oxide (IZO), zinc oxide (ZnO), indium oxide (In2O3), boron-doped zinc oxide (BZO), and magnesium-doped zinc oxide (MZO), and alternatively made of a polysilicon material or other materials;
a gate insulating layer 104 formed on the active layer 103, which may be made of an inorganic material such as silicon oxide, silicon nitride etc.;
a first metal layer 105 formed on the gate insulating layer 104, which may be made of molybdenum, aluminum, or copper, but not limited thereto, but may also be made of chromium, tungsten, titanium, tantalum, or an alloy thereof, which are not specifically limited herein;
an interlayer insulating layer 106 formed on the first metal layer 105, which may be made of an inorganic material such as silicon oxide, silicon nitride etc.;
a second metal layer 107 formed on the interlayer insulating layer 106, which may be made of molybdenum, aluminum, or copper, but not limited thereto, but may also be made of chromium, tungsten, titanium, tantalum, or an alloy thereof, which are not specifically limited herein;
a passivation layer 110 formed on the second metal layer 107, which may be made of at least one of silicon oxide and silicon nitride;
a second transparent conductive layer 111 formed on the passivation layer 110, which may be made of a conductive glass (ITO) or the like.

The layer 124 is a transparent common electrode layer formed on the color filter substrate, and may be made of a conductive glass (ITO) or the like.

The first metal layer 105 is patterned to form a gate a, a gate scan line b, a first connection line c. The second metal layer 107 is patterned to form a data line data, a source g, a drain h, a test terminal 231, a second connection line k, and a third connection line 1. The second transparent conductive layer 111 is patterned to form a pixel electrode 232.

Figure 9:
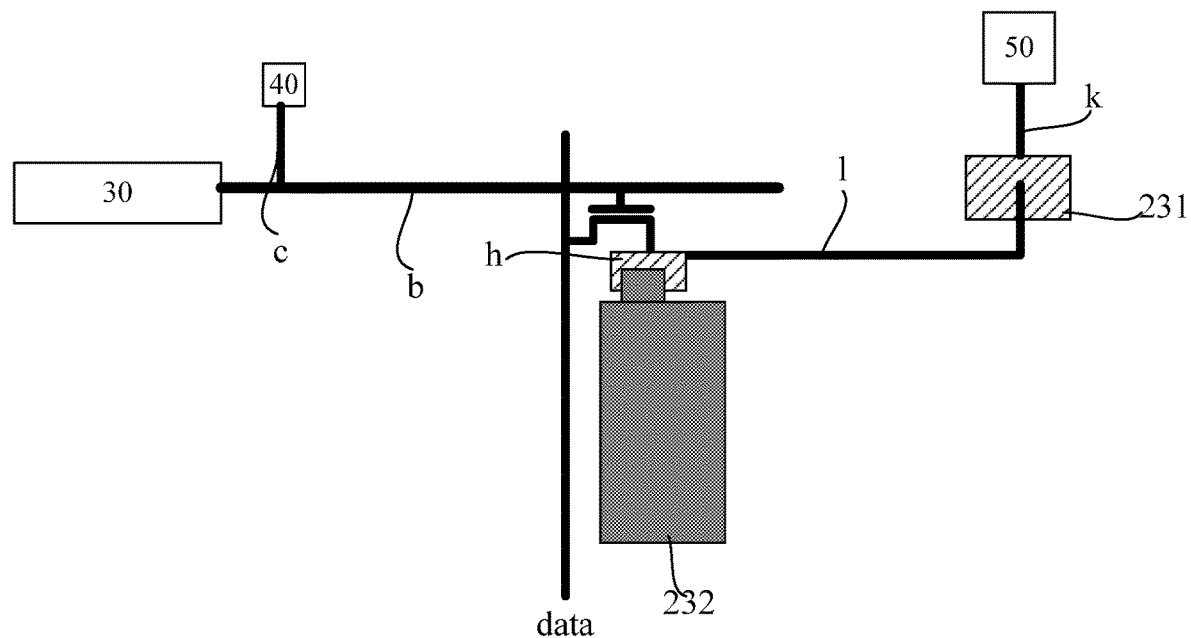
FIG. 9 is a second perspective schematic diagram of a test pixel when it does not work according to an embodiment of the present invention.
Figure 10:
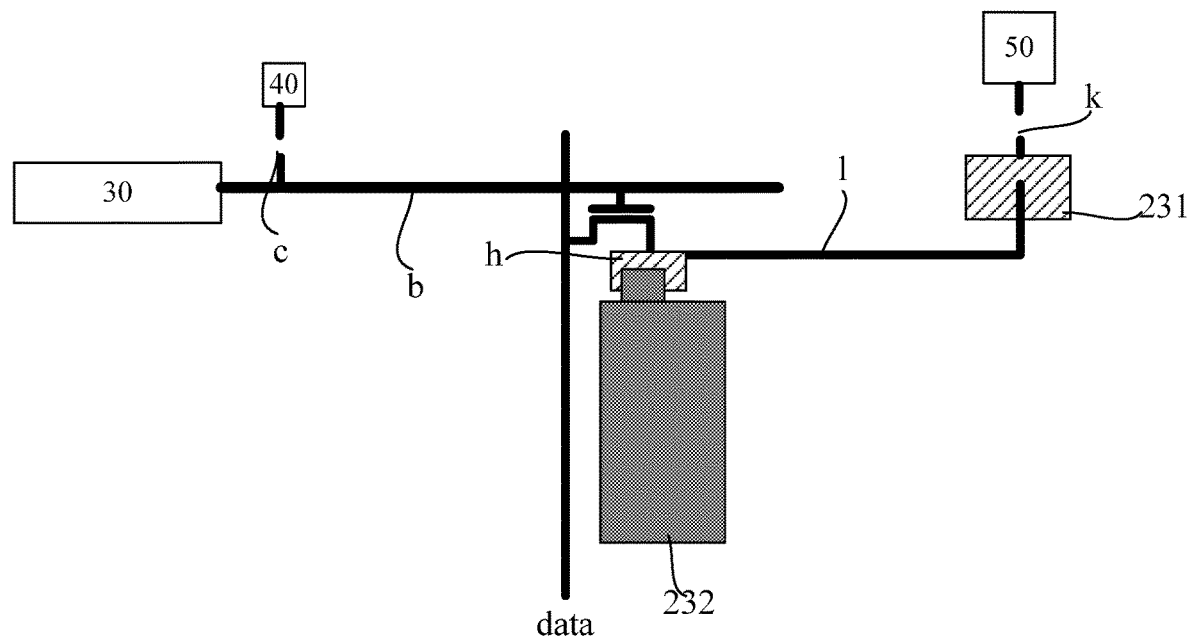
FIG. 10 is a second perspective schematic diagram of a test pixel when it is in operation according to an embodiment of the present invention.
Figure 12:
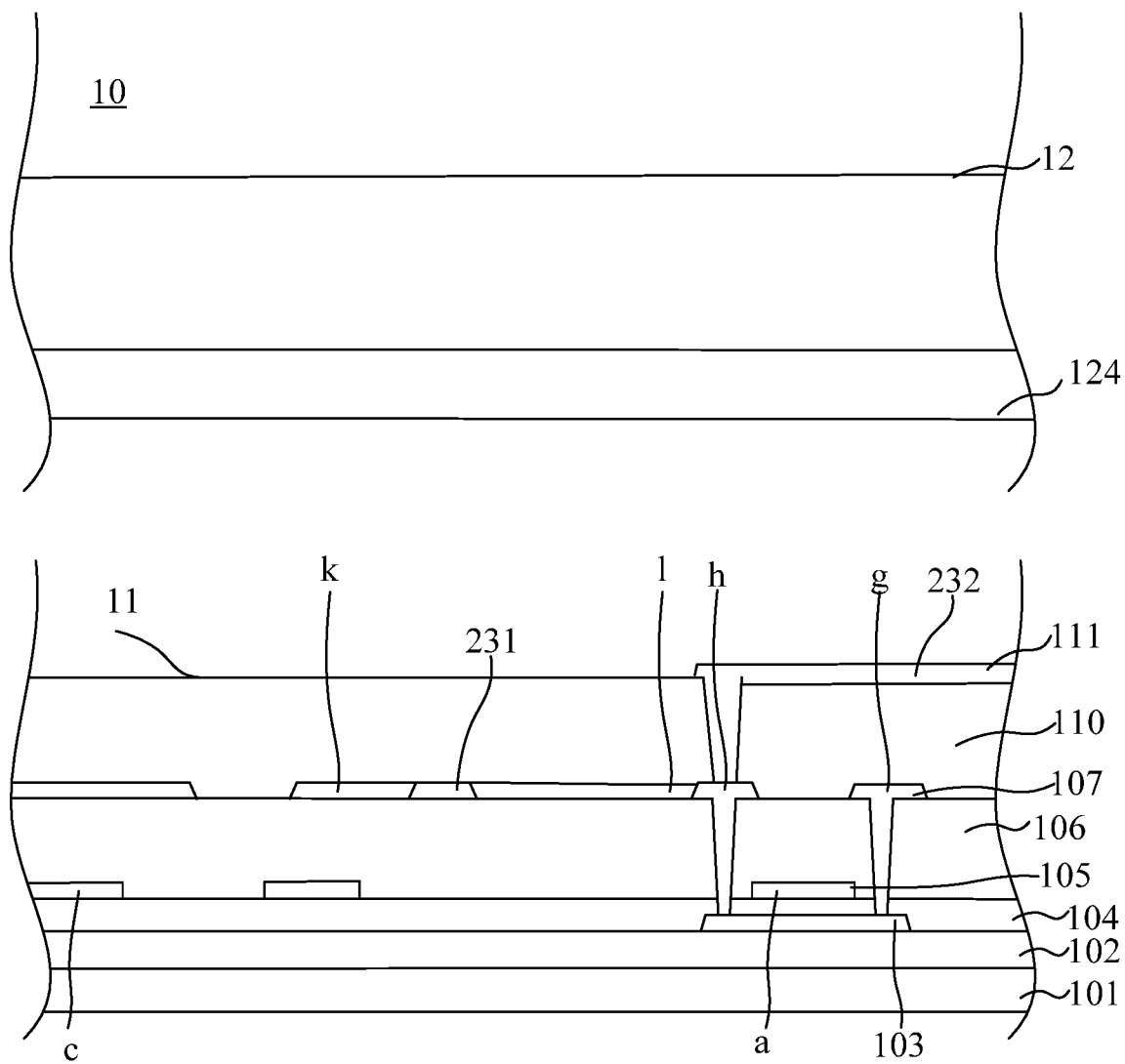
FIG. 12 is a schematic diagram of a fourth layer of a liquid crystal display panel according to an embodiment of the present invention.

As shown in FIGS. 9 and 11, when pixel voltage detection is not performed, the first connection line c and the second connection line k are kept connected, the transistor 233 is not in operation at this time, and the pixel electrode 232, the test terminal 231, and the common voltage terminal 50 are kept connected, such that there is no voltage difference between the pixel electrode 232 and the common electrode layer 121 on the color filter substrate 12. As shown in FIGS. 10 and 12, when pixel voltage detection is performed, both the first connection line c and the second connection line k are cut off by laser, etc., the transistor 233 is in operation, the pixel electrode 232 and the test terminal 231 are kept connected, the pixel electrode 232 is charged, and the pixel voltage can be detected through the test terminal 231.

The above description of the structure of each layer takes the bottom gate thin film transistor as an example. Of course, the structure of the driving circuit layer is not limited thereto, and may also include a top gate thin film transistor.

Figure 13:
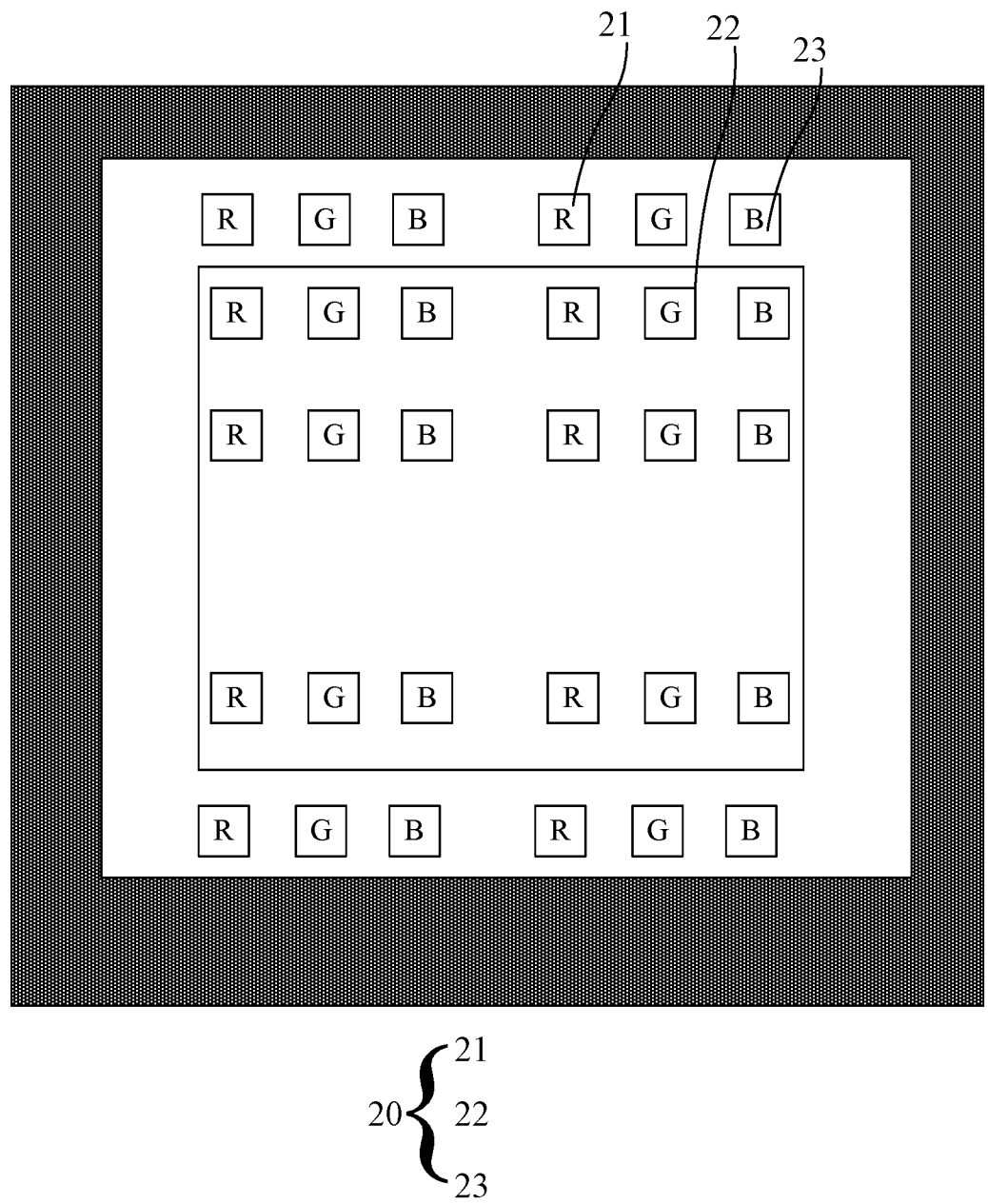
FIG. 13 is a schematic diagram of pixel distribution of a liquid crystal display panel according to an embodiment of the present invention.

As shown in FIG. 13, the position of the test pixel 23 on the display panel is generally placed at the position of the invalid pixels 21 at the uppermost end or the lowermost end of the panel.

Further, the present invention also provides a display device including the above-mentioned liquid crystal display panel and an external driving chip bound thereto.

In an embodiment, the display device according to the present invention includes:
a cover plate;
a liquid crystal display panel formed with a first blind hole;
a backlight module formed with a through hole corresponding to the first blind hole; and
a camera disposed corresponding to the first blind hole,
wherein the liquid crystal display panel comprises: a first substrate; a second substrate disposed opposite to the first substrate; liquid crystals filled between the first substrate and the second substrate; and first support walls disposed on the first substrate to support the second substrate, wherein the first support walls are disposed around the first blind hole and formed with a liquid crystal channel having a size larger than a size of each of the liquid crystals.

In an embodiment, the display device according to the present invention further includes: a secondary camera disposed corresponding to the second blind hole.

In an embodiment, the display device may be any product or component with a display function, such as a television, a display, a digital photo frame, a mobile phone, a tablet computer, or the like.

According to the above embodiments, it is known that:

The present invention provides a liquid crystal display panel and a display device. The liquid crystal display panel includes: a first substrate; a second substrate disposed opposite to the first substrate; liquid crystals filled between the first substrate and the second substrate; and first support walls disposed on the first substrate to support the second substrate, wherein the first support walls are disposed around the first blind hole and formed with a liquid crystal channel having a size larger than a size of each of the liquid crystals. In the present invention, by disposing the first support walls on the first substrate and around the first blind hole, when the first substrate and the second substrate are bonded by vacuum cell-assembly, the edge of the blind hole is supported, such that recessing of the glass substrate can be mitigated; further based on the liquid crystal channel, the liquid crystal inside and outside the blind hole can flow and communicate, avoiding the occurrence of vacuum bubbles in the blind hole area, thereby mitigating recessing of the glass substrate, reducing the curvature radius of the glass substrate in the blind hole area, and enhancing the optical performance of the blind hole area; and further, based on the vacuum cavity formed inside the first support wall, the second substrate can recess in the area corresponding to the vacuum cavity, thereby mitigate recessing of the second substrate in the blind hole area based on Seesaw theory relieves the indentation of the second substrate in the blind hole area.

In the above embodiments, the descriptions of each embodiment have their own emphasis. The parts that are not described in detail in an embodiment can be referred to the detailed descriptions in other embodiments above, which will not be repeated herein for brevity.

The liquid crystal display panel and the display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A liquid crystal display panel, provided with a first blind hole, and comprising:
a first substrate;
a second substrate disposed opposite to the first substrate;
liquid crystals filled between the first substrate and the second substrate; and
first support walls disposed on the first substrate to support the second substrate,
wherein the first support walls are disposed around the first blind hole and configured to mitigate recessing of the second substrate, four vacuum cavities are formed inside the first support walls and penetrate through the first support walls, and from a top view of the first substrate, all of the four vacuum cavities are arc-shaped and arranged around and spaced apart from the first blind hole.

2. The liquid crystal display panel according to claim 1, wherein a number of the first support walls is greater than two, and a gap between adjacent ones of the first support walls is defined as a liquid crystal channel.

3. The liquid crystal display panel according to claim 1, wherein the liquid crystal display panel is formed with a second blind hole, and the liquid crystal display panel further comprises:
second support walls disposed on the first substrate and around the second blind hole, to support the second substrate.

4. The liquid crystal display panel according to claim 3, wherein a number of the second support walls is greater than two, and a gap between adjacent second support walls is defined as a liquid crystal channel.

5. The liquid crystal display panel according to claim 3, wherein a second vacuum cavity is formed inside the second support walls.

6. The liquid crystal display panel according to claim 3, further comprising:
a plurality of third support walls formed on the first substrate to support the second substrate, wherein the third support walls are disposed between the first blind hole and the second blind hole, and formed with a liquid crystal channel.

7. The liquid crystal display panel according to claim 6, wherein a third vacuum cavity is formed inside the third support walls.

8. A display device, comprising:
a cover plate;
a liquid crystal display panel formed with a first blind hole;
a backlight module formed with a through hole corresponding to the first blind hole; and
a camera disposed corresponding to the first blind hole,
wherein the liquid crystal display panel comprises: a first substrate; a second substrate disposed opposite to the first substrate; liquid crystals filled between the first substrate and the second substrate; and first support walls disposed on the first substrate to support the second substrate, wherein the first support walls are disposed around the first blind hole, four vacuum cavities are formed inside the first support walls and penetrates through the first support walls, and from a top view of the first substrate, all of the four vacuum cavities are arc-shaped and arranged around and spaced apart from the first blind hole.

* * * * *